C. UEBELMESSER.
VARIABLE SUPPORT FOR CUTTING TOOLS.
APPLICATION FILED JAN. 13, 1919.

1,427,925.

Patented Sept. 5, 1922.
8 SHEETS—SHEET 5.

INVENTOR

C. UEBELMESSER.
VARIABLE SUPPORT FOR CUTTING TOOLS.
APPLICATION FILED JAN. 13, 1919.
1,427,925.
Patented Sept. 5, 1922.
8 SHEETS—SHEET 8.
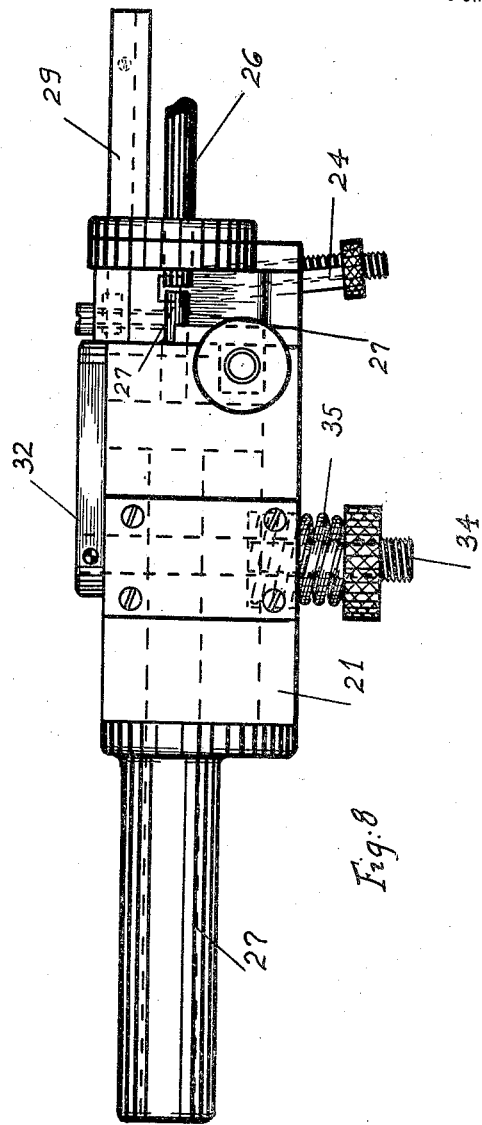

Patented Sept. 5, 1922.

1,427,925

UNITED STATES PATENT OFFICE.

CHARLES UEBELMESSER, OF NEW YORK, N. Y., ASSIGNOR, BY MESNE ASSIGNMENTS, TO ALBERT H. T. BANZHAF, OF NEW YORK, N. Y.

VARIABLE SUPPORT FOR CUTTING TOOLS.

Application filed January 13, 1919. Serial No. 270,833.

*To all whom it may concern:*

Be it known that I, CHARLES UEBELMESSER, a subject of the German Empire, residing at New York city, in the county and State of New York, have invented certain new and useful Improvements in Variable Supports for Cutting Tools, of which the following is a clear, full, and exact description.

My invention relates to an improvement in cutting tool supports such as described in my pending application filed November 7th 1918, Serial #261,581.

The object of my invention is to provide a movable cutting tool-holder in a supporting structure, said supporting structure to contain a movable guide for the cutting tool-holder, which guide is operated by head-on pressure against the work, or head-on pressure against the guide itself.

Referring to the drawings,

Fig. 8 is a left side view.

Figure 1:
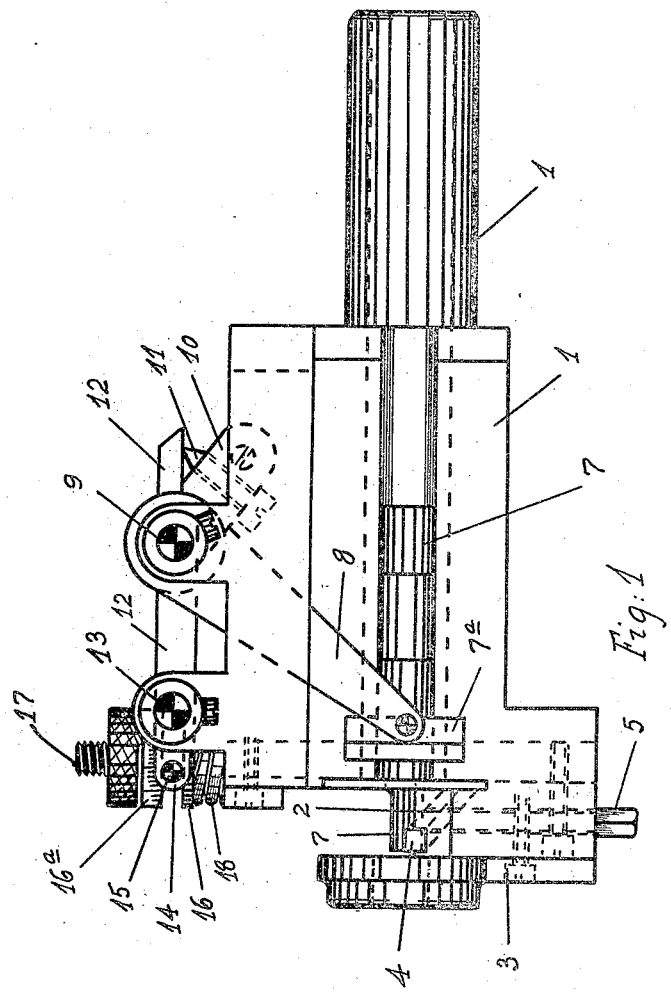
Fig. 1 is a top view of a complete tool, embodying the principle of head-on pressure against the work, the proper amount of transversal movement being compounded by leverage.
Figure 2:
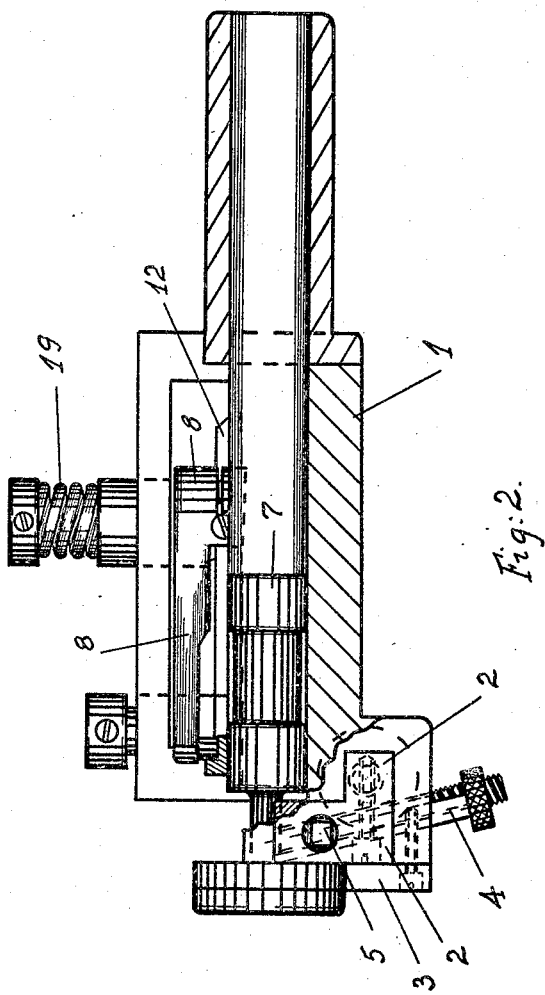
Fig. 2 is a side elevation, partly in cross section.
Figure 3:
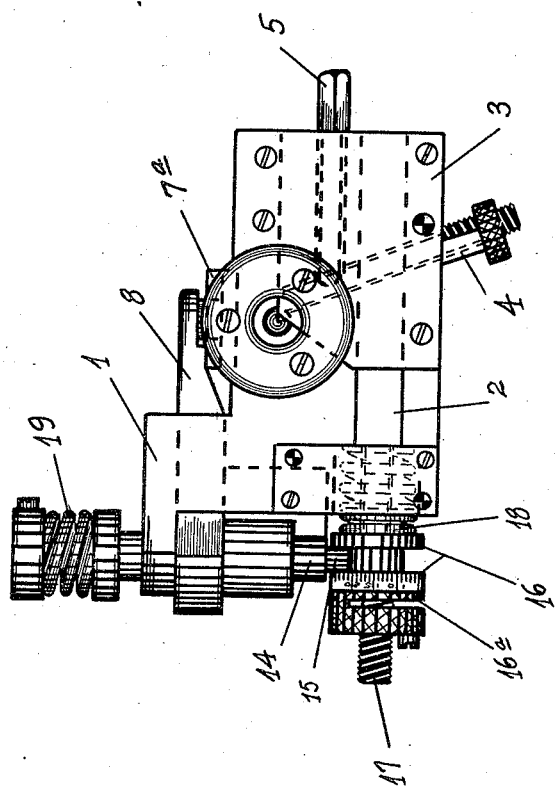
Fig. 3 is a front view.
Figure 4:
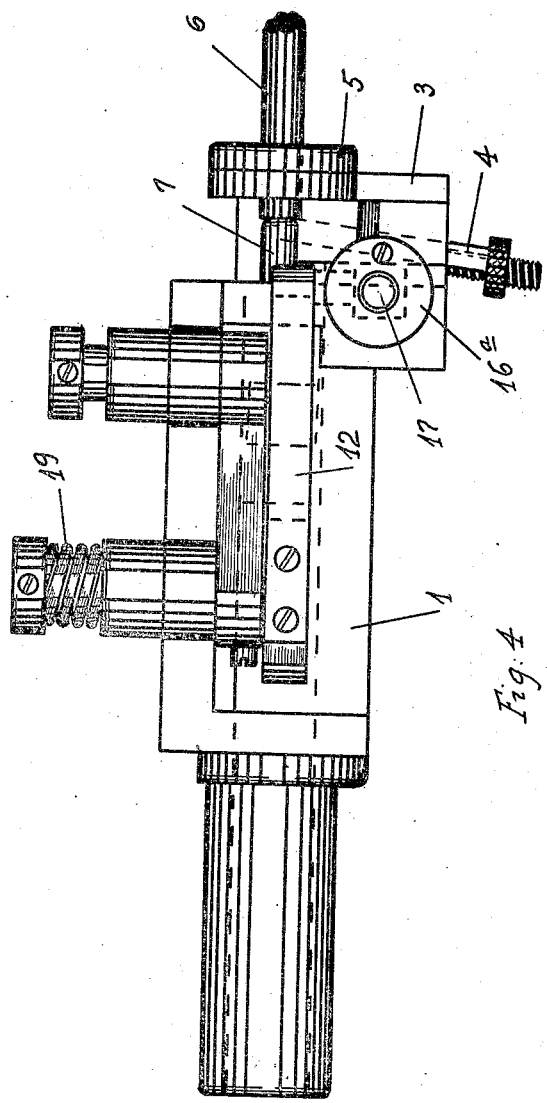
Fig. 4 is a side elevation.

As shown in Fig. 1 the main support 1 carries a slidable tool support 2, being held in position by front plate 3. A tool bit 4 is fastened in 2 by means of screw 5. The work stock bar 6 (see Fig. 4) passes through front plate 3, against the piston 7, said piston 7 slides in the main support 1, abutting against a lever 8 on the abutment portion 7ª. Lever 8 is pivoted on the main frame 1 on axis 9 and has another lever 10 abutting a screw point 11 against the 3rd lever 12. Said lever 12 is pivoted in the main support 1 at axis 13 from which point projects the 4th lever 14. Said lever 14 has a stud 15 which engages the groove 16 in the graduated screw knob 16ª, by which knob the position of the tool bit relative to the work can be adjusted to a minute fraction of an inch; the screw knob 16ª is mounted upon the threaded stub 17 and is part of the slidable tool bit support 2. As the work bar pushes upon the piston a preproportioned amount of movement is imparted to the member 2 by means of the levers 8, 10, 12 and 14. Springs 18 and 19 are employed to bring the piston 7 back to its original position after the finished work has been withdrawn.

Figure 5:
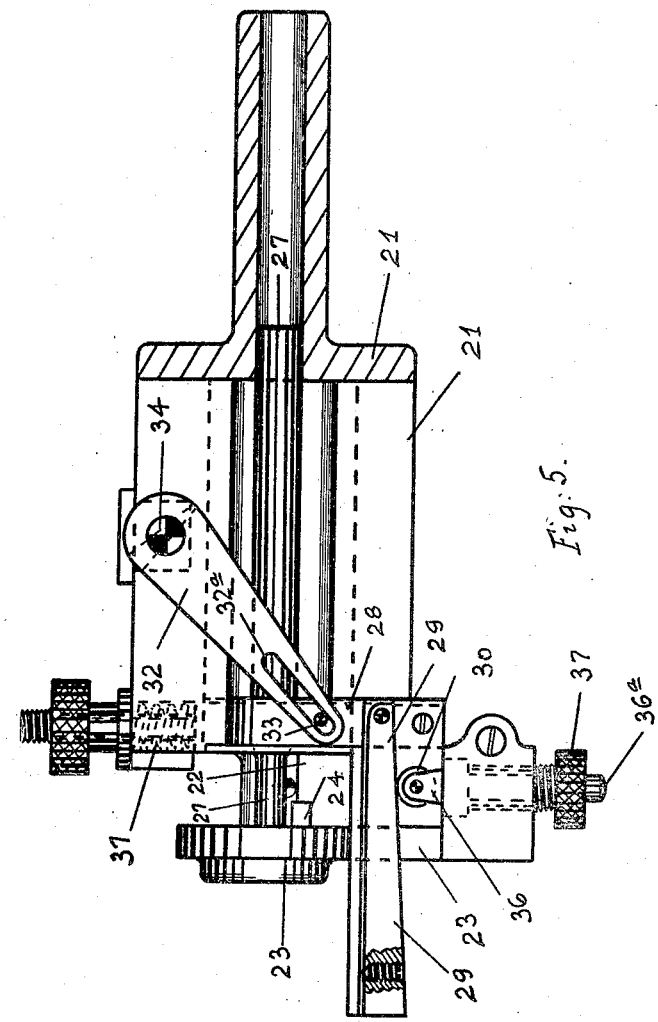
Fig. 5 is a modification and shows a top view of a complete tool embodying the principle of head-on pressure against the work, the proper amount of transversal movement being obtained by means of a sliding guide.
Figure 6:
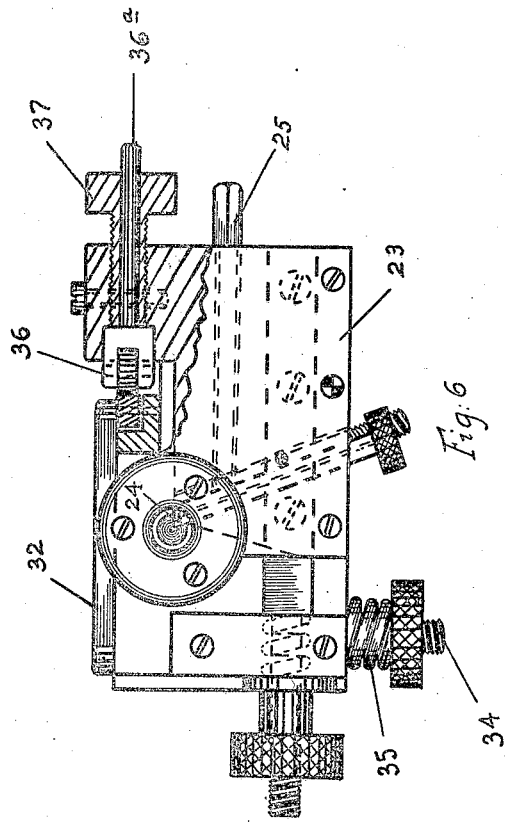
Fig. 6 is a front view of Fig. 5, partly in section.
Figure 7:
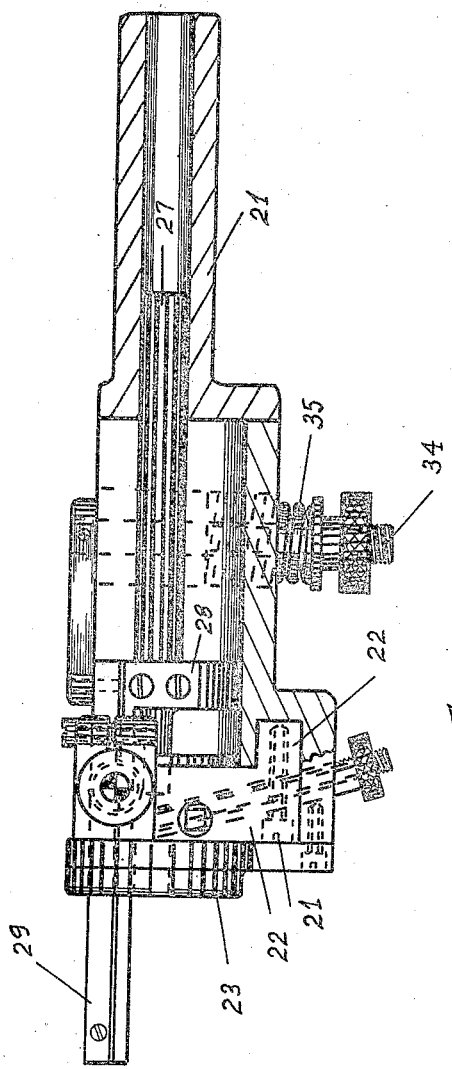
Fig. 7 is a right side view of Fig. 6, also partly in section.

Referring to Fig. 5, which is a modification, 21 is the main support. The slidable tool support 22 is being held in position by the front plate 23, and tool 24 is fastened in 22 by means of screw 25 (see Fig. 6) the work stock bar (see Fig. 8) passes through the front plate 23 against the piston 27, said piston 27 slides in the main support 21. Now this piston 27 carries on the extension 28 a guide 29 which slides back and forth with the movement of the piston 27. Against this guide 29 lays a roller 30, which roller 30 is adjustably fastened to the slidable tool support 22. The slidable support 22 is held under pressure of spring 37 against the guide 29, the piston is brought back to its first position after the finished work has been withdrawn by means of a lever 32, said lever having a slot 32ª engaging a pin 33, and said pin is part of the piston extension 28. The lever 32 is pivoted on axis 34 in the main support 21. The axis 34 has on its lower extension a spiral spring 35 which holds the lever 32 forward against the work. It is readily seen that the moving of the piston 27 moves the guide 29 which will impart to the tool-holder slide 22 whatever form the guide 29 has, and the roller 30 is adjustably mounted to the slidable support 22 by means of yoke 36, said yoke having a stud 36ª extending through a knurled screw 37 which is mounted directly into the slidable tool support 22. It is readily understood that in this modification the amount of transverse movement to the slidable tool support is determined by the guide 29, but said guide 29 is operated again by head-on pressure against the work bar 26.

What I claim is:

1. The combination, in a machine box tool, of a main support, a movable toolbit-holder, a work-holder, and a guide-carrying member abutting the work-bar in said holder, said guide member imparting motion to the toolbit-holder by head-on pressure of the work-bar.

2. In a cutting tool, the combination of a main support, a movable toolbit-holder, a work-holder and a sliding-piston, said piston abutting a work-bar within said work-holder, a series of levers interlinking said toolbit-holder and sliding piston for governing the toolbit-holder by head-on pressure of the work-bar.

Signed at New York city, New York, this January, one thousand nine hundred and nineteen.

CHARLES UEBELMESSER.

Witnesses:
MARGARET L. DUERR,
GERTRUDE DENNEEN.